(12) United States Patent
Olexson, Sr.

(10) Patent No.: US 10,034,469 B2
(45) Date of Patent: Jul. 31, 2018

(54) FISHING LURE RETRIEVAL APPARATUS AND METHOD

(71) Applicant: David E. Olexson, Sr., Easton, PA (US)

(72) Inventor: David E. Olexson, Sr., Easton, PA (US)

(73) Assignee: David E. Olexson, Easton, PA (US)

( * ) Notice: Subject to any disclaimer, the term of this patent is extended or adjusted under 35 U.S.C. 154(b) by 258 days.

(21) Appl. No.: 14/858,544

(22) Filed: Sep. 18, 2015

(65) Prior Publication Data

US 2016/0081320 A1    Mar. 24, 2016

Related U.S. Application Data

(60) Provisional application No. 62/137,554, filed on Mar. 24, 2015, provisional application No. 62/052,587, filed on Sep. 19, 2014.

(51) Int. Cl.
*A01K 97/24* (2006.01)

(52) U.S. Cl.
CPC .................................... *A01K 97/24* (2013.01)

(58) Field of Classification Search
CPC ........ A01K 97/24; A01K 81/00; A01K 81/04; A01K 81/06; A01G 3/08; A01G 3/081; A01G 3/083; A01G 3/00; A01G 2003/005; A01G 3/025; A01G 3/0255; B26B 11/00; B26B 5/00; B26B 21/08; B26B 51/4068; B26B 21/4075; B26B 21/521

See application file for complete search history.

(56) References Cited

U.S. PATENT DOCUMENTS

| | | | |
|---|---|---|---|
| 893,173 A | 7/1908 | Kunze | |
| 1,851,370 A | 3/1932 | Munger | |
| 2,171,050 A | 8/1939 | Goddeyne | |
| 2,544,449 A * | 3/1951 | Dunkelberger | ........ A01K 97/24 |
| | | | 294/65.5 |
| 2,560,723 A | 7/1951 | Hansen | |
| 2,593,716 A | 4/1952 | Bolen, Jr. | |
| 2,607,149 A | 8/1952 | Cox | |
| 2,609,632 A | 9/1952 | Davis | |
| 2,634,539 A | 4/1953 | Brown et al. | |
| 2,950,558 A * | 8/1960 | Karpes | .................. A01K 97/24 |
| | | | 43/17.2 |
| 2,968,112 A | 1/1961 | McClure | |
| 3,176,425 A | 4/1965 | Mudd | |
| 3,186,121 A | 6/1965 | Jones | |
| 3,295,243 A | 1/1967 | Mohar, Sr. | |
| 3,296,730 A | 1/1967 | Leverdingen | |

(Continued)

*Primary Examiner* — Kathleen I Alker
(74) *Attorney, Agent, or Firm* — Gearhart Law LLC

(57) ABSTRACT

A device for assisting a fisherman in retrieving stranded or snagged fishing lures that can be attached to the end of a fishing rod is described and taught. The device has a number of mechanisms of attachment to prevent the device from parting with the fishing rod during the retrieval process. On one end of the device is a component that has a cutting surface with a magnet located in a proximity thereto. The fishing lure is attracted to the magnet, adhering it to the device. The fishing line can then be cut using the cutting surface. Thus, the fishing lure is quickly freed without damaging the fishing tackle or causing bodily injury. The device can then be removed and the fishing lure retied to the fishing line.

17 Claims, 5 Drawing Sheets

(56) References Cited

U.S. PATENT DOCUMENTS

| | | |
|---|---|---|
| 3,568,353 A | 3/1971 | Kilgore |
| 3,601,920 A | 8/1971 | Mason, Jr. |
| 3,643,366 A | 2/1972 | Gates |
| 3,802,110 A | 4/1974 | Guillemain |
| 3,861,071 A | 1/1975 | Nordhagen |
| 4,086,718 A * | 5/1978 | Swanson ............. A01K 97/24 43/17.2 |
| 4,171,587 A | 10/1979 | Bullen, Jr. |
| 4,395,840 A | 8/1983 | Banks, Jr. |
| 4,467,547 A | 8/1984 | Chabot |
| 4,508,467 A | 4/1985 | Choffin |
| D280,542 S * | 9/1985 | Hurst ..................... D22/149 |
| 4,622,772 A | 11/1986 | Cawley et al. |
| 4,908,974 A | 3/1990 | Orlick |
| 5,025,585 A * | 6/1991 | Powell ............. A01K 97/00 30/286 |
| 5,216,828 A | 6/1993 | Langstone |
| 5,628,538 A | 5/1997 | Ericksen |
| 5,666,758 A | 9/1997 | Vaillier et al. |
| 5,724,762 A | 3/1998 | Thompson |
| 5,946,844 A * | 9/1999 | Stoliar ............. A01K 97/24 114/221 R |
| 5,970,617 A * | 10/1999 | Chang ............. A01G 3/0255 30/249 |
| 6,038,807 A | 3/2000 | Taylor |
| 6,305,119 B1 | 10/2001 | Kacak |
| 6,694,664 B1 | 2/2004 | Knight |
| 6,931,780 B2 | 8/2005 | Cote |
| 7,210,264 B1 * | 5/2007 | Demetris ............. A01K 87/007 43/18.1 CT |
| 7,246,462 B1 | 7/2007 | Bocharov et al. |
| 8,328,257 B1 * | 12/2012 | La Coste ............. B63B 21/54 114/230.25 |
| 8,365,460 B2 | 2/2013 | Brown |
| 8,539,711 B2 | 9/2013 | Leuckel |
| 9,220,253 B2 * | 12/2015 | Cepulonis ............. B25G 1/04 |
| 2002/0139035 A1 | 10/2002 | King et al. |
| 2005/0247523 A1 | 11/2005 | Sewell |
| 2011/0258902 A1 | 10/2011 | Cason |
| 2012/0144725 A1 | 6/2012 | Marascalco |
| 2016/0000017 A1 * | 1/2016 | Pringnitz ............. A01G 3/083 144/343 |

\* cited by examiner

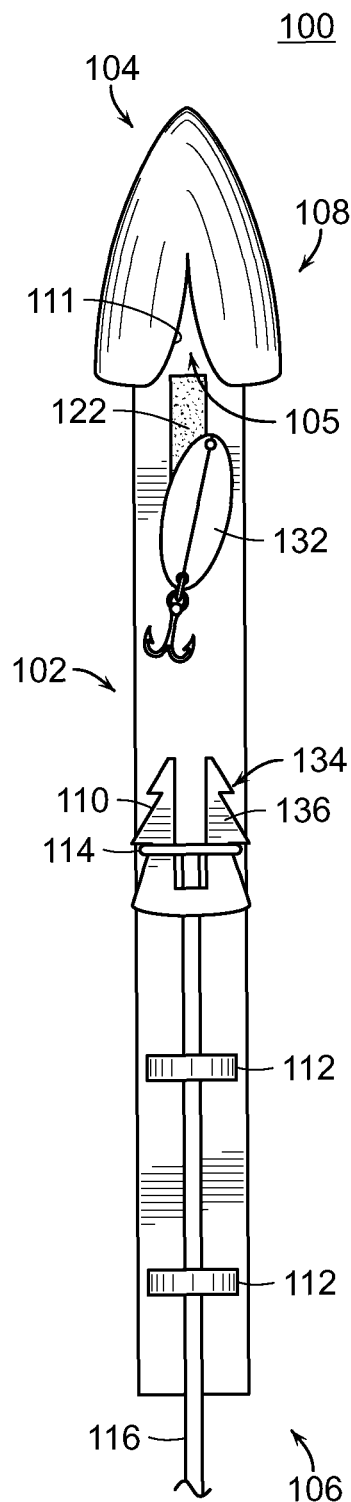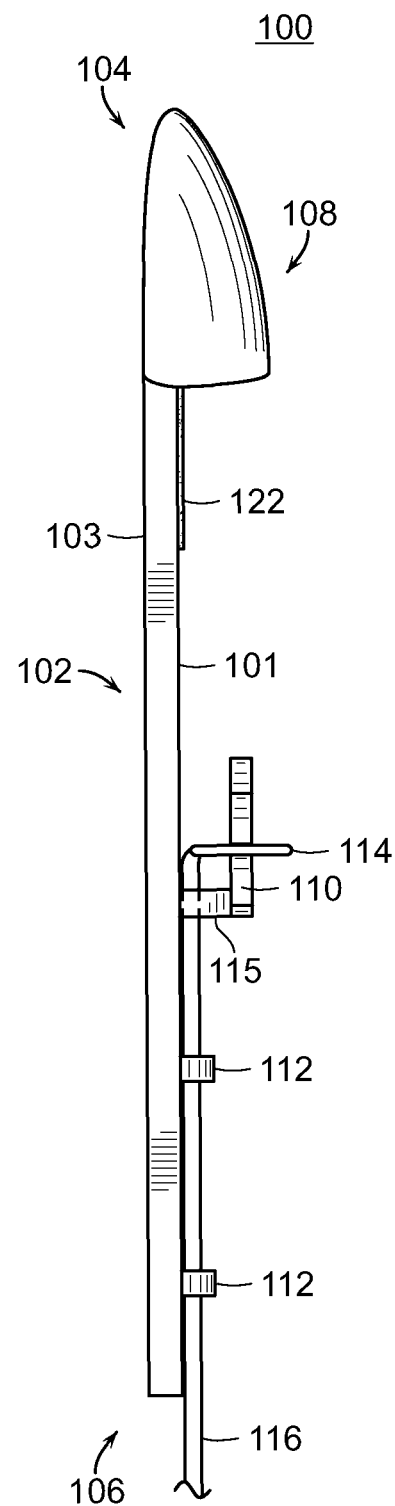

FISHING LURE RETRIEVAL APPARATUS AND METHOD

CLAIM OF PRIORITY

This application claims priority to U.S. application Ser. No. 62/137,554 filed on Mar. 24, 2015 and U.S. application Ser. No. 62/052,587 filed on Sep. 19, 2014, the contents of both of which are herein incorporated by reference in their entirety.

FIELD OF THE EMBODIMENTS

The field of the invention and its embodiments relate to an apparatus designed to retrieve ensnared objects, namely fishing lures, which are out of a user's reach. In particular, the present invention and its embodiments provide for an apparatus to retrieve ensnared fishing lures without damaging the fishing gear or risking bodily harm to the user.

BACKGROUND OF THE EMBODIMENTS

Fishing is a common hobby among outdoor enthusiasts whether done for food or sport. A fisherman typically uses a specially designed rod to cast a fishing line out into a body of water with a lure attached to the end of the line. The lure can then be left to sit in the water or can be retrieved in a number of manners depending on the type of lure being used. Artificial lures are popular with anglers as they can be designed to travel at certain depths under the surface of the water during the retrieval process and can further employ movements, colors, scents, and sounds that will attract a predatory fish.

Any accomplished fisherman knows that certain conditions and environments attract certain types of fish. Often times this leads to fisherman casting their lures into areas with many foreign objects that may catch or snag the lure and prevent it from being retrieved. It is not uncommon for lures to be caught in tree branches, grasses, and the like. Many fisherman have a favorite lure, not to mention that lures can be expensive, and are not happy when such a snag occurs.

In order to attempt to free a snagged lure, fisherman will sometimes attempt to maneuver within an arm's reach or attempt to climb the structure (tree) around which the lure is snagged. Such actions are dangerous as one may fall overboard or injure themselves in other ways thereby leading to them falling into the water. In other instances, fisherman will pull on the rod in an attempt to free the line. The typically results in a broken line sans a lure or potentially a broken fishing rod. Even yet, sometimes the lure will break free from the ensnarement and come hurtling back at the fisherman potentially causing serious injuries with the lure's barbed hooks. Overall, these retrieval methods are not effective and often result in wasted time and effort as the lure does not end up being retrieved by the fisherman.

Thus, there is a need for a lure retrieval device or apparatus that can safely and effectively retrieve a snagged lure. This not only prevents critical injuries from occurring but helps save time and money for the fisherman with each lure quickly and efficiently retrieved. The present invention and its embodiments meets and exceeds these objectives.
Review of Related Technology:

U.S. Pat. No. 8,539,711 pertains to a fishing lure retrieving device. Versions of the invention utilize a body with a cavity and handle, a sleeve movably connected to the body, a cutter and closing line. Optional telescoping handle(s), magnet(s), closing fastener(s), sleeve end cap(s) and/or body end cap(s) may also be used with versions of the invention.

U.S. Pat. No. 5,628,538 pertains to an extensible wading staff that includes an elongate shaft with first and second ends, a gripping area, a retractable hook near the first end, and a foot structure such as a rubber cap on the sealed end. A fisherman who is in water, especially moving water, may use the wading staff to maintain his balance while he is fly fishing. In addition, a fisherman may use the staff to help him retrieve snagged fishing devices such as flies, lures, lines and hooks from overhanging tree branches or underwater obstacles.

U.S. Pat. No. 5,216,828 pertains to a retrieving device comprising a base pole with a handle to which length extensions may be mounted. A top attachment which can be mounted, for retrieval of tackle from trees, and above water obstacles having a cusp section with two longitudinal shafts which bend perpendicularly having angular grooves on the inside and outside for securing fishing line during retrieval and a back attachment for securing hooks.

U.S. Pat. No. 2,171,050 pertains to a cutting device for fisherman which can be detachably be mounted on a fly rod for cutting a branch or twig on which the hook is snagged or fishing line entangled.

U.S. Pat. No. 1,851,370 pertains to a device for releasing fishing hooks. The device is a yoke-like element adapted to be attached to the end of a long pole or rod so that it can be readily caused to engage and follow the line down to the hook and to have sufficient hold on the line to push, laterally shift, or twist the latter in any manner to disengage the hook.

Various devices are known in the art. However, their structure and means of operation are substantially different from the present disclosure. The other inventions also fail to solve all the problems taught by the present disclosure. The present invention and its embodiments provides for a lightweight, easy to use fishing lure retrieval apparatus that secures a freed lure thereto. At least one embodiment of this invention is presented in the drawings below and will be described in more detail herein.

SUMMARY OF THE EMBODIMENTS

The present invention and its embodiments relate generally to a fishing lure retrieval apparatus that can be secured to the end of virtually any fishing rod. The apparatus couples to preferably the terminal eyelet on the rod. The coupling mechanism employed enables interaction with varying sized and shaped eyelets. Further, the apparatus is lightweight, yet sturdy, which provides for easy manipulation and guiding of even the lightest weight (action) fishing rods when being used with the present invention. Further, the magnetic components of the apparatus ensure the lure is coupled thereto throughout the retrieval process. A cutting surface is used to cut the fishing line and the apparatus is simply removed from the fishing rod thereafter. The lure can then be retied to the fishing line.

In one embodiment there is a fishing lure retrieval apparatus is described and taught having a retrieval body having a first end and a second end; a cutting mechanism disposed on the first end of the retrieval body; at least one securement mechanism capable of securing an eyelet of a fishing rod to the retrieval body; and wherein a length of the retrieval body exhibits magnetic properties. The fishing lure retrieval apparatus may further have at least one secondary securement mechanism. The secondary securement mechanism further releasably couples a fishing rod to the retrieval body for added support. Preferably the secondary securement mechanism is at least one releasable strap that connects two points on the retrieval body and fits over a fishing rod.

The at least one securement mechanism may be an adjustable securement mechanism. This adjustable securement mechanism is formed from a substantially vertical (perpendicular in relation to the fishing rod) extension from which extend two members that may be squeezably inserted through an eyelet of a fishing rod. The two members have multiple pressure sensitive positions, or notches, to secure to eyelets of differing sizes and shapes and to exert varying pressures on the eyelet. This feature, combined with the secondary securement mechanism prevent the fishing lure retrieval apparatus from becoming detached from the fishing rod during the retrieval process.

The cutting mechanism is preferably an edged surface and may have one or more blades along these surfaces. The cutting mechanism generally has a "V" or "U" shaped channel to help guide the line towards the cutting surface(s). In order to reach most all fishing lures, the retrieval body may be extendable.

In another embodiment of the present invention there is a fishing lure retrieval apparatus having a substantially rectangular retrieval body having a front side, a back side, a first end, and a second end; a cutting mechanism having at least one cutting surface, the cutting mechanism being disposed on the first end of the retrieval body, wherein the cutting mechanism has a guide that directs a secondary object to the at least one cutting surface; a length of magnetic material coupled to the retrieval body and located below the cutting mechanism; at least one securement mechanism, and wherein the fishing lure retrieval apparatus is releasably attachable to a fishing rod via the at least one securement mechanism.

In another embodiment of the present invention there is a fishing lure retrieval apparatus having a retrieval body having a first end and a second end, wherein a coupling mechanism is formed from the retrieval body; a cutting mechanism disposed on the first end of the retrieval body; a length of magnetic material coupled to the retrieval body and located below the cutting mechanism; and wherein the coupling mechanism removably coupled the fishing lure retrieval apparatus to a fishing rod. Here, the coupling mechanism for removably coupling the fishing lure retrieval apparatus to a fishing rod is formed from channels in the retrieval body itself.

In yet another embodiment of the present invention there is a fishing lure retrieval apparatus having a retrieval body with a first end and a second end; a cutting mechanism having at least one cutting surface, wherein the cutting mechanism has a channel shaped to guide an object to the at least one cutting surface; a rod holding mechanism comprising an adjustable securement mechanism and at least one rod channel; and at least one magnetic mechanism coupled to the retrieval body.

In another aspect of the invention there is a method of retrieving a fishing lure that has become ensnared in a fishing environment, the method having the steps of coupling a fishing lure retrieval apparatus to the terminal end of a fishing rod; placing the fishing lure retrieval apparatus within a distance to the fishing lure causing at least one metallic component of the fishing lure to become magnetically attracted to a length of magnetic material present on the fishing lure retrieval apparatus; guiding a fishing line coupled to the fishing lure towards the cutting mechanism; and applying a force to cut the fishing line with a cutting surface of the cutting mechanism.

In general, the present invention succeeds in conferring the following, and others not mentioned, benefits and objectives.

It is an object of the present invention to provide a fishing lure retrieval apparatus that removably attaches to a fishing rod or similar item.

It is an object of the present invention to provide a fishing lure retrieval apparatus that severs a fishing line while retaining a fishing lure.

It is an object of the present invention to provide a fishing lure retrieval apparatus that is lightweight.

It is an object of the present invention to provide a fishing lure retrieval apparatus that saves the fisherman money by freeing snagged and previously unretrievable lures.

It is an object of the present invention to provide a fishing lure retrieval apparatus that prevents or limits bodily injury.

It is an object of the present invention to provide a fishing lure retrieval apparatus that prevents or limits fishing tackle or gear breakage.

It is an object of the present invention to provide a fishing lure retrieval apparatus that is affordable.

It is an object of the present invention to provide a fishing lure retrieval apparatus that can be used to retrieve lures snagged above or below water.

BRIEF DESCRIPTION OF THE DRAWINGS

FIG. 1 is a front view of an embodiment of the present invention with a fishing rod attached thereto.

FIG. 2 is a side view of an embodiment of the present invention with a fishing rod attached thereto.

DESCRIPTION OF THE PREFERRED EMBODIMENTS

Figure 3:
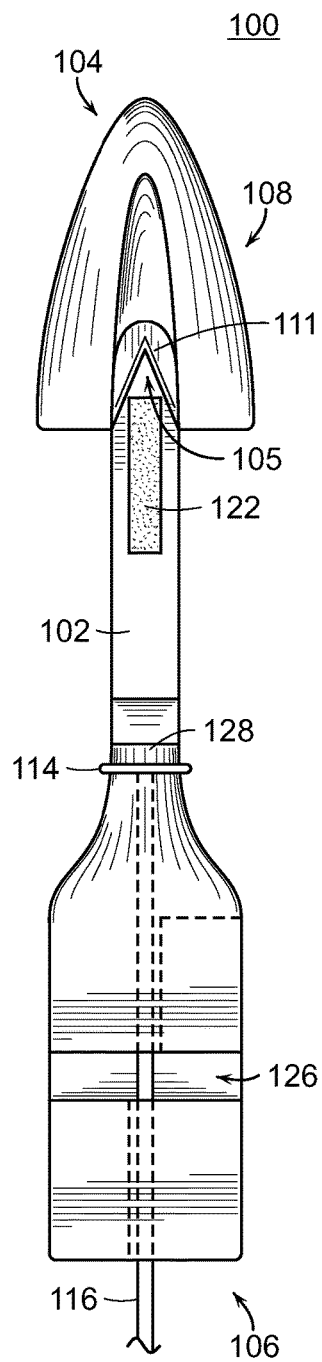
FIG. 3 is a front view of another embodiment of the present invention with a fishing rod attached thereto.

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

Referring now to FIGS. 1 and 2, there is an embodiment of the fishing lure retrieval apparatus 100. The fishing lure retrieval apparatus 100 is generally to be used in conjunction with a fishing rod 116 to retrieve snagged fishing lures above water. However, the fishing lure retrieval apparatus 100 may be attached to a number of secondary objects to retrieve lures above or below the water level.

The fishing lure retrieval apparatus 100 has a retrieval body 102 that supports or is integrated with the other components of the apparatus. The retrieval body 102 is generally rectangular and thin and constructed of lightweight yet resilient material, as to not provide undue weight to the end of a fishing rod 116. Such weight could cause the fishing rod 116 to bend with the fishing lure apparatus 100 attached thereto, thus greatly complicating the fishing lure retrieval effort.

The fishing lure retrieval apparatus 100 has a first end 104 and a second end 106 along with a front side 101 and a back side 103. On the first end 104 is a cutting mechanism 108. The cutting mechanism 108 is a structure that boasts a generally "V" or "U" shaped cutting channel 105. The cutting channel 105 is lined with a cutting surface 111 such as a metallic or other composition blade. In some cases, the cutting mechanism 108 itself is sharpened in a way to remove the need for a secondary blade and will act as the cutting surface 111 instead.

Below or adjacent to the cutting mechanism 108 is a length of magnetic material 122. The length of magnetic material 122 may be a piece separate from and affixed to the retrieval body 102 or may be part of the retrieval body 102 itself. A fishing lure 132 is shown being magnetically attracted to the magnetic material 122 in FIG. 1.

At some point along the retrieval body 102 there is a securement mechanism 110 and at least one secondary securement mechanism 112. The securement mechanism 110 preferably has at least two pressure sensitive members 136. Each pressure sensitive member 136 has an outer edge or surface with notches 134. These notches 134 are shaped to retain the eyelet 114 of a fishing rod 116. The pressure sensitive members 136 are configured to want to naturally separate from one another. As the eyelet 114 is brought further towards the base of the securement mechanism 110, the pressure sensitive members 136 exert a greater outward force on the eyelet 114 thereby securing it in place. This also provides for flexibility in the size and shape of the eyelet 114 as the end opposite from the extension 115, as shown in FIG. 2, is narrower than the base section of the securement mechanism.

The securement mechanism 110 is also held at a height above the fishing rod 116 by an extension 115 of the mechanism. The extension 115 provides the pressure sensitive members 136 at an appropriate height for interaction with the eyelet 114. The width of the eyelet 114 is largest at the center and the extension is designed to center the pressure sensitive members 136 at that level. Further, the extension 115 has an opening extending therethrough where the fishing rod 116 and eyelet 114 can pass in order to be coupled to the securement mechanism 110. The extension 115 can further help prevent unwanted movement of the fishing lure retrieval apparatus 100 by restricting its movement through the opening.

The secondary securement mechanism(s) 112 may be flexible straps or bands preferably permanently attached to the retrieval body 102 on one end (fixed end) with a free end that can be removably coupled to the retrieval body 102. The free end may couple to the retrieval body 102 using snaps, hook and loop fasteners, buttons, clips, and the like or any combination thereof. These mechanisms prevent the side to side or back and forth movement of the rod 116 once it is coupled to the securement mechanism 110. In other embodiments, the secondary securement mechanism 112 is an elastic band or similar structure which can be stretched to allow the eyelet 114 to pass, but then returns to its original shape to tightly secure the rod 116 to the retrieval body 102.

Figure 4:
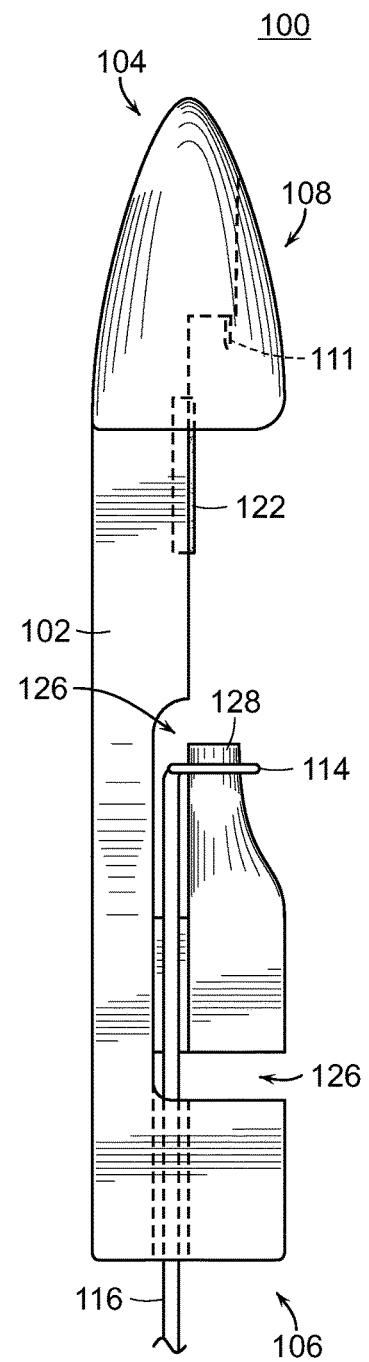
FIG. 4 is a side view of another embodiment of the present invention with a fishing rod attached thereto.

Referring now to FIGS. 3 and 4, there is another embodiment of the present invention. The operation is substantially the same, however, the mechanism by which the fishing lure retrieval apparatus 100 is coupled to the fishing rod 116 differs.

As shown, there is a fishing lure retrieval apparatus 100 having a retrieval body 102 with a first end 104 and a second end 106. On the first end 104 there is a cutting mechanism 108 having a cutting surface 111. Objects are guided to the cutting surface 111 by the cutting channel 105. Located below the cutting mechanism 108 is a length of magnetic material 122. The length of magnetic material 122 adheres to the hooks or other metallic parts of a fishing lure to couple the lure thereto. The attraction of the fishing lure and the cutting of the line are accomplished via the same general mechanisms are described in FIGS. 1 and 2.

The second end 106 has the mechanism of attachment for removably coupling the fishing rod 116 to the fishing lure retrieval apparatus 100. There are a number of channels 126 and a protruding mechanism 128 which combine to securely hold the fishing lure retrieval apparatus 100 in place on the end of a fishing rod 116.

In order to attach the embodiment as shown in FIG. 3, the fishing rod 116 is laid in the channel 126 running perpendicular to the fishing lure retrieval apparatus 100. The fishing rod 116 is then rotated about 90° as it rests in the lower portion of the channel 126. As shown in FIG. 4, there is another channel 126 that runs parallel to the fishing lure retrieval apparatus 100 and underneath the channel 126 shown in FIG. 3. This second channel enables the fishing rod 116 to be aligned with fishing lure retrieval apparatus 100. The eyelet 114 is then slid down over the protruding mechanism 128.

The protruding mechanism 128 is a flared extension which secures the position of the eyelet 114 and thereby the fishing rod 116 as a whole. To remove the fishing lure retrieval apparatus 100, pressure is applied to release the eyelet 114 from the protruding mechanism 128. The fishing rod 116 is then rotated to align with the perpendicular oriented channel and lifted. The protruding mechanism 128 may further be shaped and function as the securement mechanism 110 in FIGS. 1 and 2. Alternatively, the protruding mechanism 128 may only have some textural structure on its outer surface to provide additional grip to the eyelet 114.

Figure 5:
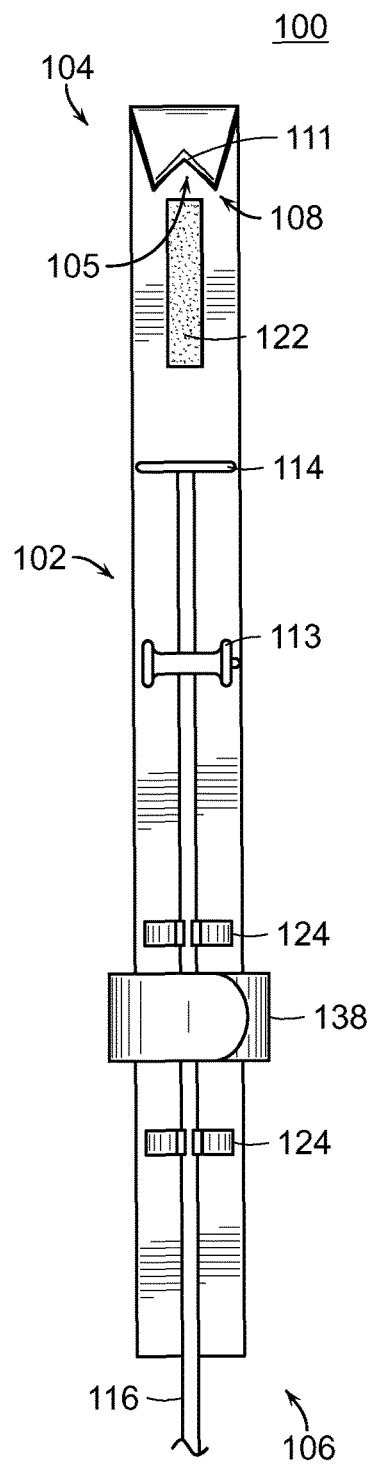
FIG. 5 is a front view of a third embodiment of the present invention with a fishing rod attached thereto.
Figure 6:
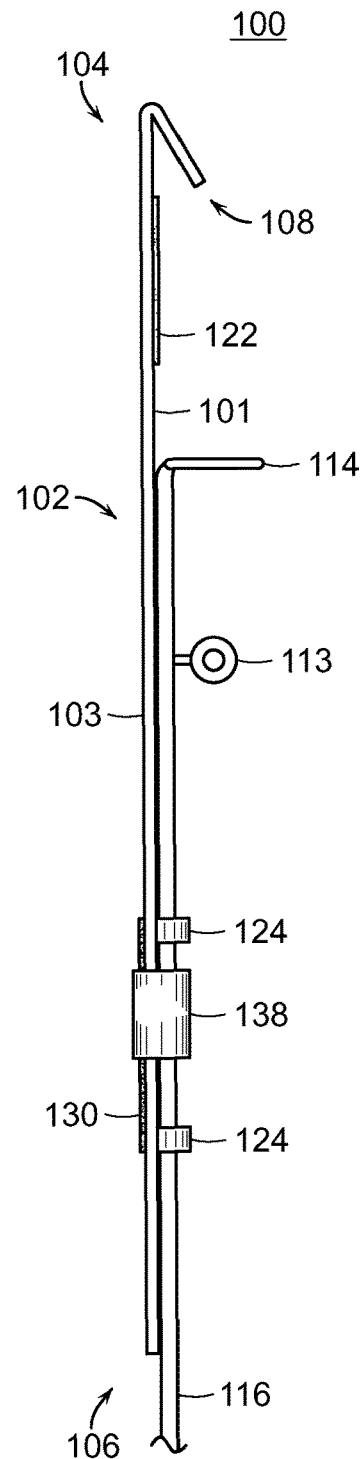
FIG. 6 is a side view of the third embodiment of the present invention with a fishing rod attached thereto.

In FIGS. 5 and 6 there is a third embodiment of the present invention. The fishing lure retrieval apparatus 100 again generally functions as the embodiments described above. The difference again being the mechanism of attachment.

The fishing lure retrieval apparatus 100 has a first end 104 and a second end 106, as well as a front side 101 and a back side 103. Here, the retrieval body 102 is substantially rectangular. On the first end 104 there is a cutting mechanism 108. The cutting mechanism 108 has a generally "V" or "U" shaped cutting channel 105 wholly or partially formed into a cutting surface 111. The cutting surface 111 may be part of the cutting mechanism 108 or an added feature such as a blade. Below, or adjacent to, the cutting mechanism 108 is a length of magnetic material 122 positioned to attract a fishing lure's metallic components.

Further, there are a number of securement mechanisms to couple the fishing lure retrieval apparatus 100 to a fishing rod 116. There is one and preferably at least two coupling mechanisms 124 attached to the front side 101 of the retrieval body 102. The coupling mechanisms 124 have a narrow passageway with a receiving area that is sized to receive a fishing rod 116. The fishing rod 116 is pushed down through the narrower passageway into the wider receiving area and held therein by the passageway which is narrower than the fishing rod 116.

A guide member 113 prevents the tip of the fishing rod 116 from being forced away from the retrieval body 102 by positioning the fishing rod 116 between the guide member 113 and the retrieval body 102. This further prevents the fishing rod 116 from being pulled from the coupling mechanisms 124. A releasable fastener 138 may be used to further secure the fishing rod 116 to the retrieval body 102. The releasable fastener 138 may employ a hook and loop fastener 130 for securement purposes or alternatively any other snap, fastener, clasp, or the like or any combination thereof. When the fishing rod 116 is secured as shown in FIG. 5, the fishing rod 116 is effectively prevented from becoming separated from the fishing lure retrieval apparatus 100 from becoming separated from the fishing rod 116.

Figure 7:
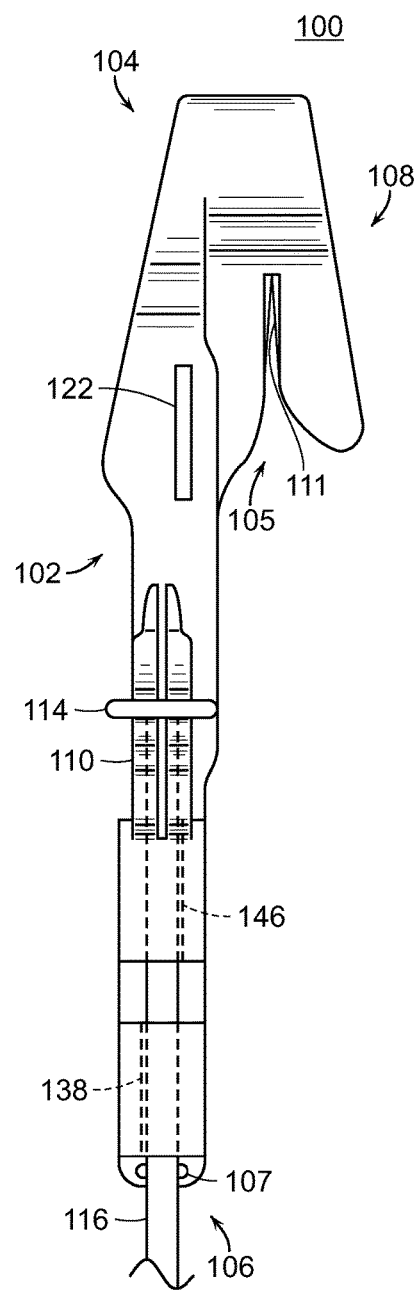
FIG. 7 is a front view of a fourth embodiment of the present invention with a fishing rod attached thereto.
Figure 8:
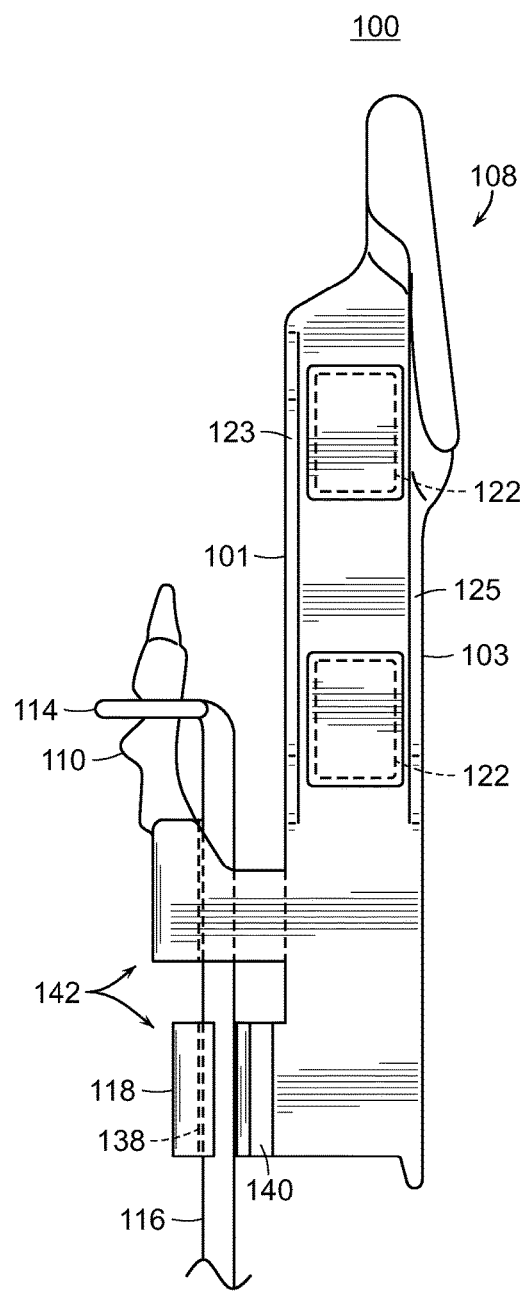
FIG. 8 is a side view of the fourth embodiment of the present invention with a fishing rod attached thereto.

Referring now to FIGS. 7 and 8, there is a front view and a side view, respectively, of another embodiment of the present invention. The fishing lure retrieval apparatus 100 is shown generally having a retrieval body 102, a front side 101, a back side 103, a first end 104, and a second end 106. The fishing lure retrieval apparatus 100 is shown with a fishing rod 116 coupled thereto.

The fishing lure retrieval apparatus 100 has a rod holding mechanism 142 disposed on the front side 101 of the retrieval body 102. The rod holding mechanism 142 comprises an adjustable securement mechanism 110 for selectively positioning the eyelet 114 of a fishing rod 116 thereon. The adjustable securement mechanism 110 may have at least one and preferably multiple positions (i.e. two or more) of securement that enables different sized eyelets 114 and different tensions to be applied to the eyelet 114. The adjustable securement mechanism 110 may be depressible and/or flexible allowing for flexing or depression of the free end of the adjustable securement mechanism 110 enabling easy application and removal of the eyelet 114 of the fishing rod 116. The fishing rod 116 is also positioned under the adjustable securement mechanism 110 thereby preventing or limiting rotational and back and forth movement of the fishing rod 116.

The rod holding mechanism 142 further comprises a rod holder 118. The rod holder 118 is generally a "c" shaped mechanism having a first rod channel 138 and a second rod channel 140. The rod channels are preferably of differing dimensions thereby allowing rods of different shapes and sizes to be attached thereto. Further, since the rod channels are in a stacked orientation, the channels also permit usage with fishing rods 116 whose eyelets 114 protrude at varying distances from the rod itself. There are two rod channels as shown, however, there may be virtually any number of rod channels having any shape and size. Further, these channels may be in various configurations and may be staggered in relation to one another.

Generally, a rod channel "u" shaped and has a narrower top of the "u" in relation to the receiving area of the channel. This enables the rod to be pushed into the channel and "snap" into the channel and be sufficiently held thereto. The rod is preferably then manually removed when no longer needed. As shown in FIG. 7, the position of the first rod channel 138, as well as the second, third, fourth, etc. rod channel is configured to reside on one side of the fishing lure retrieval apparatus 100. The adjustable securement mechanism 110 has a blocking wall 146 located on an opposing side of the fishing lure retrieval apparatus 100. This positioning of the components of the rod holding mechanism 142 effectively "locks" the fishing rod 116 into place when properly positioned for use.

On an opposing end, from the rod securement mechanism 142, of the fishing lure retrieval apparatus 100 there is a cutting mechanism 108 which houses a cutting surface 111. A cutting channel 105 has rounded or soft edges to guide the fishing line into the cutting surface 111 therein. The cutting surface 111 may be a razor edge or blade contained within the cutting mechanism 108. In some iterations, the cutting surface 111 may be removable or replaceable. The cutting mechanism 108, in such an iteration, would provide access, such as a removable piece or "door," to facilitate quick and easy change of the cutting surface 111. In other embodiments described herein, the cutting mechanism 108 is generally "inline" with the retrieval body 102 and the apparatus as a whole. Here, as shown in FIG. 7, the cutting mechanism 108 is offset to one side of the midline of the retrieval body 102. The particular side of the retrieval body 102 to which the cutting mechanism 108 is located and the degree of offset may vary from what is explicitly shown herein.

The cutting mechanism 108 operates in conjunction with the magnetic material 122 as shown. As described above, typically fishing lures have a metallic and/or magnetic component. The magnetic material or mechanism 122 can be used to magnetically attract these areas of the fishing lure. The magnetic material 122 can be virtually any material that exhibits magnetic properties, but is preferably of light weight as to not add undue weight to the end of the fishing rod. The magnetic material 122 may be located on a surface of the retrieval body 102 or may be embedded therein or may be contained completely within the retrieval body 102. The magnetic material 122 is flanked by a first edge 123 and a second edge 125. The first edge 123 and the second edge 125 are protrusions located above and below the magnetic material 122. These protrusions provide a surface for the fishing lure to abut against and guide the fishing lure to the magnetic material 122.

An attachment mechanism 107 is located at some point or points along the retrieval body 102 and may be located at either the first end 104 or the second end 106 or a combination thereof. As shown, the attachment mechanism 107 forms a loop at a second end 106 of the retrieval body 102. The formed loop enables attachment of the fishing lure retrieval apparatus 100 to a fisherman's vest, tackle, boat, and the like by way of a string, clip, drawstring, or other suitable means. The attachment mechanism 107 may take other forms as long as it enables attachment to a suitable object as described.

Figure 9:
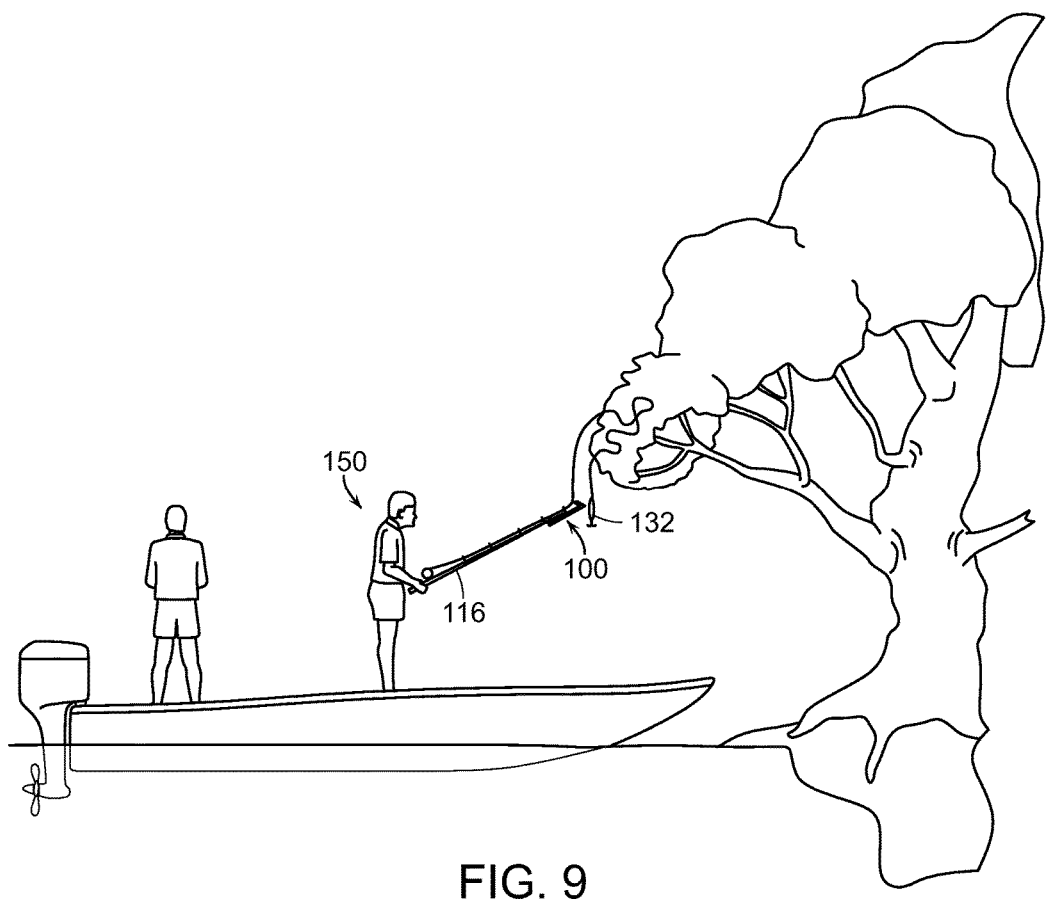
FIG. 9 is an illustration showing the present invention in use.

FIG. 9 demonstrates one potential implementation for using fishing lure retrieval apparatus 100 as described herein. The fishing lure 132 has become tangled in a tree and is dangling out of reach of the fisherman 150. A fisherman 150 couples the fishing lure retrieval apparatus 100 to their fishing rod 116 according to the coupling mechanisms in the above described embodiments. The skilled artisan will further recognize that there may be a number of variations of securement mechanisms, not described herein, which may be employed without departing from the scope of this disclosure.

The fisherman 150 can then reach out with their fishing rod 116 to attract the metal or magnetic components of the fishing lure 132 to the magnetic material 122 (see FIG. 1) of the fishing lure retrieval apparatus 100. Typically such components are the hook(s), jig heads, eyelets, and the like. Once these magnetic components are secured, the fishing line is then guided towards the cutting mechanism and its cutting surface. A force is applied to the fishing line via the fishing lure retrieval mechanism 100 thereby severing the fishing line. The freed lure can then be retrieved from the obstruction and subsequently retied to the fishing line.

The fishing lure retrieval apparatus 100 described in FIGS. 1-6 is intended to retrieve fishing lures snagged or otherwise caught out of the reach of a fisherman. In order to enable one to reach such lures in a variety of locations, the retrieval body 102 may be extendable. This would enable one to elongate either from the first end 104 or second end 106 to increase the reach. A number of collapsible concentric rods or other extendable components may be used to effectively increase or decrease the length of the fishing lure retrieval apparatus as needed. There may further be some mechanism of locking or securing a position of the retrieval body 102 once a length is chosen to prevent any derivation therefrom during the retrieval process.

Preferably, the fishing lure retrieval apparatus 100 is about 7.6 cm (3 inch) to about 30 cm (12 inch) in length. If the fishing lure retrieval apparatus 100 has an extendable retrieval body, the overall length fully extended may range from about 0.15 m (6 inch) to about 1.2 m (48 inch) in length. The magnet 122 may have a length of about 1.3 cm (0.5 inch) to about 15 cm (6 inch) with a preferred length of about 2.5 cm (1 inch) to about 7.6 cm (3 inch). In some cases, the magnet 122 is supplied by the retrieval body 102 as it may be comprised of various metals which exhibit magnetic properties. When extending the retrieval body 102 it important that the magnet 122 and the cutting mechanism 108 are both contained in the terminal end of the extension. Otherwise, the fishing lure will not be properly retrieved.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A fishing lure retrieval apparatus comprising:
   a retrieval body having a first end and a second end;
   a cutting mechanism disposed on the first end of the retrieval body;
   a rod holding mechanism configured to couple a fishing rod to the retrieval body,
   the rod holding mechanism comprising:
      at least one securement mechanism configured to secure an eyelet of the fishing rod to the retrieval body, the at least one securement mechanism having a blocking mechanism disposed on a first side of the retrieval body for contacting the fishing rod, and
      a rod channel longitudinally offset from the at least one securement mechanism along the retrieval body,
         wherein the rod channel has an opening, a wall, and a receiving area, the receiving area being configured to receive the fishing rod with a portion of the receiving area furthest from the opening being formed by the wall disposed on an opposing side of the retrieval body from that of the blocking mechanism such that the fishing rod, when coupled to the retrieval apparatus, is positioned between the wall and the blocking mechanism; and
   wherein a length of the retrieval body exhibits magnetic properties.

2. The fishing lure retrieval apparatus of claim 1 wherein the rod channel is "U" shaped.

3. The fishing lure retrieval apparatus of claim 1 wherein the at least one securement mechanism is capable of being variably positioned through the eyelet of the fishing rod.

4. The fishing lure retrieval apparatus of claim 1 wherein the blocking mechanism comprises at least one blocking wall.

5. The fishing lure retrieval apparatus of claim 1 wherein the cutting mechanism is an edged surface.

6. A fishing lure retrieval apparatus comprising:
   a retrieval body having a first end, a second end, a first side and a second side;
   a cutting mechanism having at least one cutting surface, wherein the cutting mechanism has a channel shaped to guide an object to the at least one cutting surface;
   an adjustable securement mechanism configured to secure an eyelet of a fishing rod to the retrieval body,
      wherein the adjustable securement mechanism passes at least partially through and engages the eyelet of the fishing rod; and
      wherein the adjustable securement mechanism has 3a blocking wall disposed on the first side of the retrieval body for contacting the fishing rod;
   a rod channel longitudinally offset from the adjustable securement mechanism along the retrieval body, the rod channel having an opening, a channel wall, and a receiving area, the receiving area being configured to receive the fishing rod with a portion of the receiving area furthest from the opening being formed by the channel wall disposed on the second side of the retrieval body,
      wherein the second side of the retrieval body is an opposite side of the retrieval body from the first side of the retrieval body, such that the fishing rod, when coupled to the retrieval apparatus, is positioned between the channel wall and the blocking wall; and
   at least one magnetic mechanism coupled to the retrieval body.

7. The fishing lure retrieval apparatus of claim 6 wherein the at least one cutting surface is replaceable.

8. The fishing lure retrieval apparatus of claim 6 wherein the cutting mechanism is offset from a midline of the fishing lure retrieval apparatus.

9. The fishing lure retrieval apparatus of claim 6 further comprising a first edge and a second edge protruding laterally from the retrieval body.

10. The fishing lure retrieval apparatus of claim 9 wherein the first edge and the second edge are disposed on opposing sides of the at least one magnetic mechanism.

11. The fishing lure retrieval apparatus of claim 9 wherein the first edge and the second edge flank the at least one magnetic mechanism.

12. The fishing lure retrieval apparatus of claim 6 further comprising an attachment mechanism.

13. The fishing lure retrieval apparatus of claim 6 wherein the adjustable securement mechanism is capable of securing eyelets of varying sizes and shapes.

14. A method of retrieving a fishing lure that has become ensnared in a fishing environment, the method comprising:
   coupling a fishing lure retrieval apparatus of claim 1 to a fishing rod;
   placing the fishing lure retrieval apparatus within a distance to the fishing lure causing at least one length of magnetic material disposed on the fishing lure to become magnetically attracted to the fishing lure retrieval apparatus;
   guiding a fishing line coupled to the fishing lure towards the cutting mechanism; and applying a force to cut the fishing line with a cutting surface of the cutting mechanism.

15. The method of claim 14 further comprising the steps of:
retrieving the fishing lure retrieval apparatus; and
removing the fishing lure from the fishing lure retrieval apparatus.

16. The method of claim 15 further comprising the step of:
retying the fishing lure to the fishing line.

17. The method of claim 14 further comprising the step of:
adjusting a length of the fishing lure retrieval apparatus by extending or collapsing the retrieval body in order to facilitate retrieval of the fishing lure.

\* \* \* \* \*